(12) United States Patent
Sabrie et al.

(10) Patent No.: US 8,935,029 B2
(45) Date of Patent: Jan. 13, 2015

(54) METHOD FOR COOLING AN ELECTRICITY STORAGE MEANS

(75) Inventors: Julien Sabrie, Paris (FR); Stephane Rimaux, Meudon (FR); Thomas Cadilhac, Issy les Moulineaux (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 0 days.

(21) Appl. No.: 13/810,429

(22) PCT Filed: Jul. 13, 2011

(86) PCT No.: PCT/FR2011/051672
§ 371 (c)(1),
(2), (4) Date: Jan. 15, 2013

(87) PCT Pub. No.: WO2012/017151
PCT Pub. Date: Feb. 9, 2012

(65) Prior Publication Data
US 2013/0116877 A1    May 9, 2013

(51) Int. Cl.
| | | |
|---|---|---|
| *H01M 10/50* | (2006.01) | |
| *H01M 10/625* | (2014.01) | |
| *B60L 11/18* | (2006.01) | |
| *H01M 10/613* | (2014.01) | |
| *H01M 10/6563* | (2014.01) | |
| *H01M 10/667* | (2014.01) | |
| *H01M 16/00* | (2006.01) | |

(52) U.S. Cl.
CPC ....... *H01M 10/5016* (2013.01); *B60L 11/1868* (2013.01); *B60L 11/1874* (2013.01); *H01M 10/5004* (2013.01); *H01M 10/5067* (2013.01); *H01M 10/5097* (2013.01); *H01M 16/00* (2013.01); *Y02T 10/7005* (2013.01); *Y02T 10/7066* (2013.01)
USPC ............................................. 701/22; 165/41

(58) Field of Classification Search
CPC ........... B60L 11/1868; B60L 11/1874; H01M 10/5004; H01M 10/5016; H01M 10/5067; H01M 10/5097; H01M 16/00; Y02T 10/7005; Y02T 10/705; Y02T 10/7066; Y02T 10/7088; Y02T 90/14; Y02E 60/12
USPC ................. 701/22, 81; 903/903, 907; 165/41; 310/104, 109
See application file for complete search history.

(56) References Cited

U.S. PATENT DOCUMENTS 6,166,449 A * 12/2000 Takaoka et al. ............. 290/40 B
6,232,748 B1 * 5/2001 Kinoshita ..................... 320/132
(Continued)

OTHER PUBLICATIONS

International Search Report from corresponding International Application No. PCT/FR2011/051672 mailed Nov. 17, 2011.

*Primary Examiner* — Mary Cheung
*Assistant Examiner* — Atul Trivedi
(74) *Attorney, Agent, or Firm* — Polster, Lieder, Woodruff & Lucchesi, L.C.

(57) ABSTRACT

The invention relates to a device and a method for cooling an electricity storage means, in particular a high-capacity battery (110), said device comprising: cooling means (130) for cooling said storage means; a "low voltage" battery (120); means (130), supplied with power by the low voltage battery (120), for increasing the rate of cooling of the storage means (110). The invention also relates to a vehicle (100), especially a motor vehicle, comprising such a device, said vehicle comprising an electric power train (220).

4 Claims, 3 Drawing Sheets

(56) References Cited

U.S. PATENT DOCUMENTS

| | | | |
|---|---|---|---|
| 6,489,050 B1 * | 12/2002 | Ruhl et al. | 429/439 |
| 6,586,940 B2 * | 7/2003 | Asakura et al. | 324/426 |
| 7,869,911 B2 * | 1/2011 | Yamaguchi | 701/22 |
| 8,600,598 B2 * | 12/2013 | Simonini et al. | 701/22 |
| 8,620,506 B2 * | 12/2013 | Kummer et al. | 701/22 |
| 2002/0069000 A1 * | 6/2002 | Nakao | 701/22 |
| 2004/0048118 A1 * | 3/2004 | Nakaji et al. | 429/22 |
| 2004/0079564 A1 * | 4/2004 | Tabata | 180/65.2 |
| 2007/0029124 A1 * | 2/2007 | DasGupta et al. | 180/65.3 |
| 2007/0277876 A1 * | 12/2007 | Huang et al. | 136/259 |
| 2008/0012535 A1 * | 1/2008 | Takatsuji et al. | 320/150 |
| 2009/0024252 A1 | 1/2009 | Aridome et al. | |
| 2009/0030626 A1 * | 1/2009 | Iwane et al. | 702/63 |
| 2009/0140698 A1 * | 6/2009 | Eberhard et al. | 320/152 |
| 2009/0310308 A1 * | 12/2009 | Lowell et al. | 361/700 |
| 2010/0131139 A1 * | 5/2010 | Sakai et al. | 701/22 |
| 2010/0321025 A1 * | 12/2010 | Lin et al. | 324/427 |
| 2011/0121787 A1 * | 5/2011 | Kim et al. | 320/134 |
| 2012/0003510 A1 * | 1/2012 | Eisenhour | 429/50 |
| 2012/0109554 A1 * | 5/2012 | Lin et al. | 702/63 |
| 2012/0263984 A1 * | 10/2012 | Krammer | 429/82 |
| 2012/0280050 A1 * | 11/2012 | Tonozuka et al. | 236/94 |
| 2013/0166119 A1 * | 6/2013 | Kummer et al. | 701/22 |

* cited by examiner

METHOD FOR COOLING AN ELECTRICITY STORAGE MEANS

CROSS-REFERENCE TO RELATED APPLICATIONS

The present application is the US National Stage under 35 U.S.C. §371 of International Application No. PCT/FR2011/051672, filed Jul. 13, 2011, and which claims priority to French Application No. 1055876 filed Jul. 20, 2010.

BACKGROUND

The invention relates to a device and a method for cooling an electricity storage means, such as a battery. It also relates to a vehicle, such as a car, comprising such a device, which comprises an electric power train.

The power train unit is fed by an electricity storage means with high energy potential which may take on the form of a so-called high voltage battery, or else a fuel battery. To preserve the lifespan of the electricity storage means, the electricity storage means must be cooled to maintain it within a temperature range acceptable for the components it contains.

When the vehicle is in operation, a portion of the electric power delivered by the storage means is used for its own cooling, which can be achieved through various methods such as circulation of a heat transfer fluid in a cooling circuit or by circulating an air flow using a fan. An implementation problem resides in attempting this cooling when the vehicle has stopped, and more specifically, when the power train unit has been under great stress during the moments preceding stoppage of the vehicle and when the power storage means has reached a high temperature. But, for safety reasons, the high energy potential means cannot continue to draw power to ensure its cooling when the vehicle is at a standstill.

The power storage means with high energy potential is said to be in operation when it delivers electric power to a circuit that is necessarily closed. It is no longer in operation when the electric circuit of which it is a part, is open.

SUMMARY

This invention is aimed at rectifying these inconveniences of the prior art through a device that cools electric power storage means with high energy potential. The device includes:
  Cooling means for the storage means;
  A low voltage battery;
  Means, energized by the low voltage battery, capable of cooling the storage means when the storage means is no longer in operation.

As such, the power contained in the low voltage battery can be used risk-free to cool the high potential power storage means when it is no longer in operation.

The invention can be implemented according to the beneficial methods of the embodiment described below which can be considered individually or according to any technical combination of operation.

Advantageously, the device also includes a charging device capable of using the power storage means with high potential power when it is in use to recharge the low voltage battery. As such, the charge status of the low voltage battery can be maintained at any time at a level which is sufficient to cool the electricity storage means.

In accordance with one embodiment, the cooling means includes a fan.

According to a specific embodiment, the high potential energy storage means comprises a high voltage battery. As such, the device is more specifically suited for use in an electric hybrid vehicle.

The invention also relates to a vehicle, such as a car, comprising a device according to any of the embodiments of the invention and a power train supplied with power provided by high potential energy storage means. The device targeted by the invention is used beneficially in such a vehicle to extend the lifespan of the power storage means with high potential energy, and consequently to reduce the maintenance cost for such vehicle.

The invention also relates to a process or method to cool the electricity storage means with high potential energy. The method includes:
  A step of cooling the storage means when the storage means is operating and delivering an electric current through a power circuit;
  A step of cooling the storage means when it is no longer in operation, with this step implementing a low voltage battery.

When the storage means is in operation, this process beneficially includes the steps of:
  a. Measuring the temperature of the storage means with high potential power when the storage means is in operation;
  b. Determining a time interval until the next operating cutoff or shutoff of the storage means with high potential power;
  c. Extrapolating the temperature reached by the storage means when the next operating cut off or shutoff is reached;
  d. Calculating the power required to return the storage means to a nominal temperature defined after the operating cutoff or shutoff;
  e. Measuring the charge status of the low voltage battery to determine a charge need for the power required as determined in step d as well as the charge time necessary to produce a charge corresponding to such need;
  f. Comparing the charge time necessary with the time interval determined in step b;
  g. Triggering the low voltage battery charge if the charge time is higher than or equal to the time interval determined in step b.

As such, this process or method permits optimizing the low voltage battery charge while maintaining the charge at what is strictly needed for cooling the high potential power storage means and for the best performance of the low voltage battery. This way, it limits power usage through the low voltage battery for the high potential power storage means.

The process can be beneficially implemented in a vehicle that comprises a device according to any of the embodiments of the invention, with the time interval calculated at step b being determined by the driving conditions of the vehicle. As such, with the low voltage battery charge being optimized, vehicle autonomy in the electric driving mode is increased while preserving the lifespan of the storage means.

According to the first embodiment of the process applied to an electric drive vehicle, the driving conditions of the vehicle are determined by the measured vehicle speed, the evolution of speed over time and the analysis of these data using a statistical base. This embodiment is more specifically adapted to a vehicle for which the drive method is mainly or exclusively electric in nature.

According to another embodiment of the process applied to a vehicle comprising a geolocation device, the time interval determined in step b is calculated on the basis of data coming from the geolocation device. This embodiment is more specifically, but not exclusively, adapted to hybrid vehicles in which the methods of propulsion can be alternated or combined and where the driving conditions in terms of speed and power transmitted in the propulsion are not always correlated with the stresses of the storage means with high potential power.

These two embodiments of the process applied to a vehicle comprising an electric drive can be combined.

DESCRIPTION OF THE FIGURES

The invention will now be described more precisely within the framework of these preferred methods of embodiments, which are not limiting, and FIGS. 1 to 3, where.

DETAILED DESCRIPTION

Figure 1:
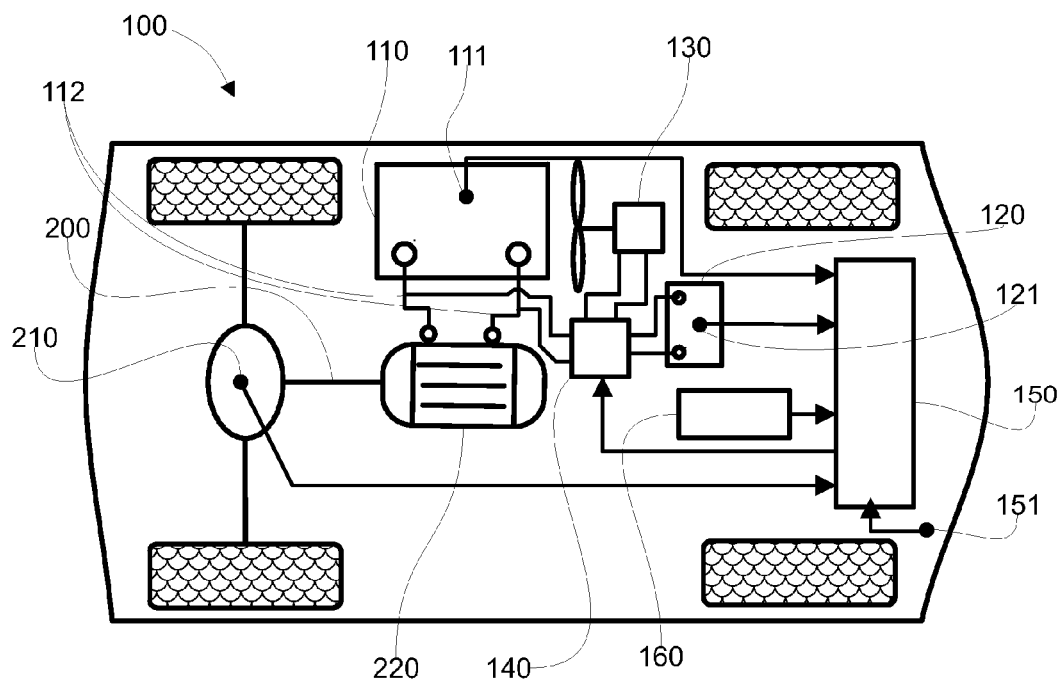
FIG. 1 represents schematically as seen from above and seen as a section, a motor vehicle comprising a device accordance to an exemplary embodiment of the invention.

An exemplary embodiment of the device covered by the invention applied to an automotive vehicle 100 is shown in FIG. 1. The device comprises a power storage means with high potential power 110 which supplies power through a power circuit 112, an electric power train 220 for which the power is used to move the vehicle by means of a power train 200. For an application in an automotive vehicle, the high potential power storage means 110 is often, but not exclusively, in the form of a high voltage battery, generally based on the lithium-ion technology. The power circuit 112 also includes a bypass towards a transformer/controllable distributor 140 which permits transforming the voltage coming from the high voltage battery into a voltage suitable to recharge a low voltage battery 120 and to feed a fan motor 130, which is used to cool the high voltage battery 110 by air circulation. On the other hand, the transformer/distributor 140 comprises controllable connection means (not shown) so that it can feed the fan motor 130 by the electric power coming from the high voltage battery or by the low voltage battery 120 as well as feeding the low voltage battery 120 with power coming from the high voltage battery 110. When the power train unit has stopped and the low voltage battery 120 feeds the fan motor 130, the power circuit 112 is open.

Transformer/distributor 140 is controlled by a supervisor/monitor 150 which collects data from various sensors. As such, according to an embodiment, the supervisor/monitor uses a temperature sensor 111 to measure the temperature of the high voltage battery 110, a voltage sensor 121 to measure the charge status of the low voltage battery, a speed sensor 210 for measuring the speed of the vehicle, and a temperature sensor 151 to measure the ambient temperature. The supervisor/monitor 150 also receives information about the geolocation of the vehicle while being connected for instance to the navigation device 160 of the vehicle.

Figure 2:
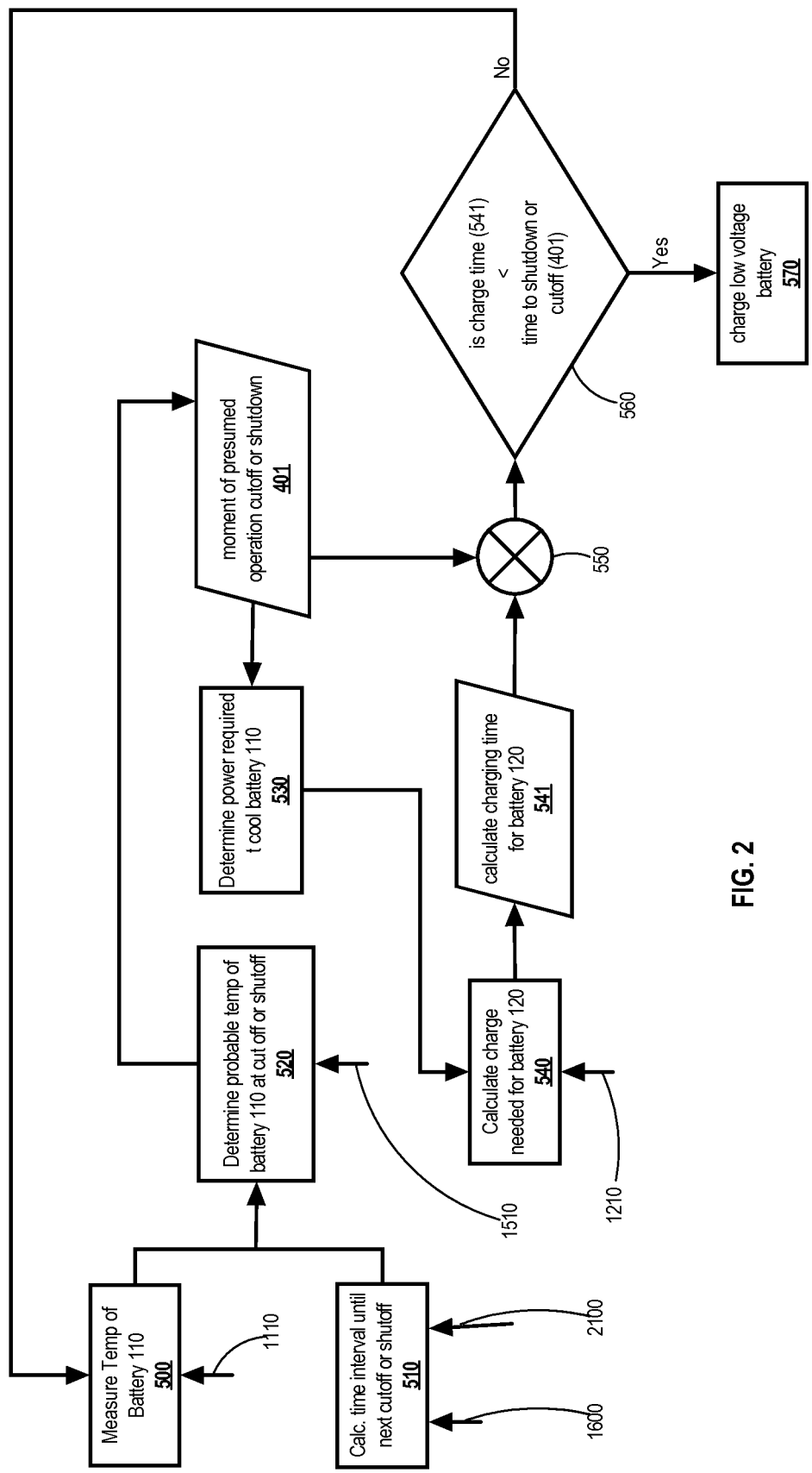
FIG. 2 is a flow chart or logic diagram of the process according to the invention.

An exemplary embodiment of the process or method of the invention is shown in FIG. 2. As shown therein, the first stage 500 of the process or method comprises measuring the temperature 1110 of the high voltage battery 110. Like the other steps of the process, this stage is implemented by supervisor/monitor 150 which includes means for memory, computation, and signal acquisition and processing. Temperature 1110 is measured by at least one sensor 111 which directly measures the high voltage battery temperature. In addition, one or several additional sensors (not shown) can be used to measure the temperature of the heat transfer fluid used for cooling the battery.

During a stage 510, which takes place in parallel to the stage 500, the time interval separating the present moment and the next operating cutoff or shutoff is calculated on the basis of information such as speed 2100 of the vehicle (measured by the speed sensor 210), or location 1600 of vehicle 100 (which location comes from the navigation device 160 of the vehicle). For instance, if supervisor/monitor 150 detects important speed variations, with the maximum speed being less than or equal to 50 km/hr, it determines that it is an urban type ride and that its duration will, statistically speaking, be ten minutes. If on the other hand, the supervisor detects a stabilized speed that is higher than or equal to 100 km/hr, the supervisor determines that it is a highway ride for which the average duration is, statistically speaking, about one hour. Alternatively, knowing the probable destination and the average speed of the ride by the navigation system 160 of the vehicle, the supervisor/monitor 150 determines the time interval separating the present moment from the future operating cutoff or shutdown.

The statistical data can be established in table form or be correlated to complex behaviors measured throughout the speed variations by artificial intelligence techniques or by learning, such as networks of neurons or recursive modeling.

Knowing this time interval and the temperature 1110 of the high voltage battery 110, an extrapolation stage 520 beneficially takes into account the outside (ambient) temperature 1510 and permits calculating the probable temperature of the high voltage battery at the time that operation is cut off or shut down.

Figure 3:
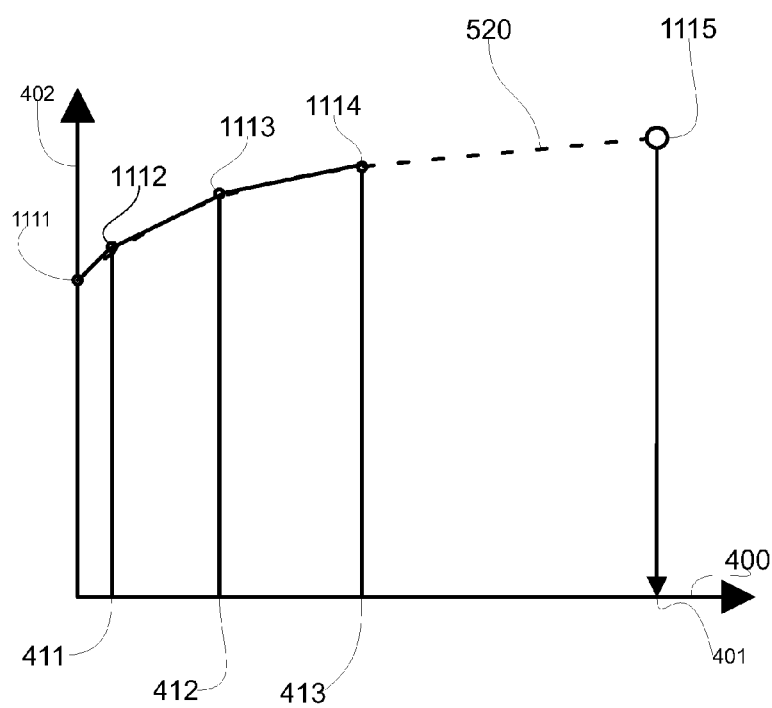
FIG. 3 shows a time extrapolation example of the temperature of the storage means with high potential power.

An exemplary extrapolation, shown in FIG. 3, is obtained by measuring the evolution of temperature 402 of the high voltage battery on the basis of time 400. As such, at the initial moment, an initial temperature 1111 of the high voltage battery is measured. This temperature increases over time to reach a second temperature 1112 after a first time span 411. A third temperature 1113 and a fourth temperature 1114 are reached after a second time span 412 and a third time span 413. From this measurement, the temperature is extrapolated at 520 by a given mathematical function up to temperature 1115 which corresponds to moment 401 of the presumed operation cutoff or shutdown.

Coming back to FIG. 2, knowing temperature 1115 of the high voltage battery at presumed moment 401 of the operating cutoff or shutdown permits for a computation stage 530 to determine the quantity of power required to cool the high voltage battery and to bring it back within thermal conditions which are non-damaging for its lifespan.

For instance, if one notes E the energy required to cool the high voltage battery 110, M the mass of the high voltage battery, Cp the heat capacity of the battery, $T_A$ temperature 1115 calculated for the battery at the time of shutting down operation and $T_c$ the targeted temperature of the high voltage battery following the cooling, then:

$$E = M \cdot Cp \cdot (T_A - T_c)$$

Knowing this quantity of energy E at the end of the calculation stage 530, permits during another calculation stage 540 using among other information 1210 of the charge status of the low voltage battery, to calculate at 540 the charge needed for the low voltage battery and to deduce at stage 541 the necessary charging time.

The charging time is obtained by comparing the charge status of the low voltage battery with the quantity of power required for cooling the high voltage battery, while targeting an optimum charge rate for the low voltage battery.

By comparison, the time necessary for this charge 541 and the remaining time interval 401 until the presumed operation cutoff or shutdown, a comparison stage 550 compares the charge time 541 and the time 401 until the operation is cut off or shut down, and a comparison stage 560 determines at stage 541 whether the charge time is less than or equal to the time interval determined at stage 401. In the event that comparison at stage 560 is positive, the supervisor/monitor triggers a stage 570 that charges the low voltage battery. Otherwise, the process is taken back to the beginning.

To recharge the low voltage battery 120, the supervisor/monitor 150 controls the transformer/distributor 140 so that a portion of the high voltage battery power is used to charge the low voltage battery.

When the vehicle stops and operation is cut off or shut down, through the transformer/distributor 140, the supervisor/monitor 150 opens power circuit 112 and feeds the fan motor 130 from the low voltage battery 120 to ensure cooling of the high voltage battery 110.

The skilled person shall adapt without a problem other variations of the embodiment. For instance, the fan motor can be replaced by a hydraulic pump to circulate the heat transfer fluid for cooling the high potential power storage means. Alternatively, a liquid cooling circuit can be used with the low voltage battery feeding a fan which permits accelerating the cooling of the liquid in a radiator. The low voltage battery charge can be provided by a generator activated by the power train 220 or by an internal combustion power train if the vehicle 100 is a hybrid vehicle.

The above description clearly illustrates that by its different features and their advantages, this invention achieves the targeted objectives. In particular, it permits optimizing the moment of the low voltage battery charge for cooling high potential power storage means by controlling power consumption of the device.

The invention claimed is:

1. A method for cooling a power storage means with high potential power of a vehicle,
   the vehicle comprising said power storage means; a power circuit which is powered by said power storage means; a low voltage battery and a fan; said fan being operable to cool said power storage means, said fan being in electrical communication with both said power storage means and said low voltage battery to be selectively powered by one of said power storage means and said low voltage battery, and said low voltage battery being selectively placed in communication with said power storage means to be charged by said power storage means; wherein the method includes:
   a step of cooling the power storage means when it is operating and delivering an electric current through a power circuit; said step of cooling the power storage means during operation of the power storage means comprising powering said fan via said power storage means; and
   a step of cooling the power storage means when said power storage means is not being operated and is no longer delivering power; this step of cooling the power storage means comprising powering said fan using said low voltage battery;
   wherein, while the storage means is operating, the method comprises the steps of:
   a. measuring the temperature of the power storage means with high potential power when said power storage means is in operation;
   b. determining a time interval until the next cutoff of operation of the power storage means with high energy potential;
   c. extrapolating the temperature the power storage means will reach at the next operation cutoff or shutdown;
   d. calculating the power required to operate the fan to bring the power storage means back to a determined nominal temperature after the operation cutoff or shutdown;
   e1. measuring the charge status of the low voltage battery;
   e2. determining the need to charge the low voltage battery by comparing the charge status with the power required to operate the fan as determined during step (d) to bring the power storage means back to a determined nominal temperature after the operation cutoff or shutdown;
   e3. determining the charge time necessary to charge the low voltage battery so that it has sufficient power to bring the power storage means back to a determined nominal temperature after the operation cutoff or shutdown;
   f. comparing the charge time determined in step (e3) with the time interval determined in step (b); and
   g. triggering the low voltage battery charge if the charge time is higher than or equal to the time interval determined in stage step (b).

2. The method according to claim 1 wherein the time interval calculated during step (b) is determined by the driving conditions of the vehicle.

3. The method according to claim 2 wherein the driving conditions of the vehicle are determined by measuring the speed of the vehicle or the evolution of the speed of the vehicle over time and analysis of these data by means of a statistical base.

4. The method according to claim 2 wherein the vehicle includes a geolocation device and that the time interval determined during step (b) is calculated from data coming from the geolocation device.

* * * * *